(Model.)

D. S. BLUE.
Thill Coupling.

No. 234,746.  Patented Nov. 23, 1880.

Witnesses:
W. C. McArthur
Geo. R. Porter

Inventor:
Dennis S. Blue,
per
Chas. N. Fowler
Attorney.

UNITED STATES PATENT OFFICE.

DENNIS S. BLUE, OF FREMONT, OHIO.

THILL-COUPLING.

SPECIFICATION forming part of Letters Patent No. 234,746, dated November 23, 1880.

Application filed October 15, 1880. (Model.)

*To all whom it may concern:*

Be it known that I, DENNIS S. BLUE, a citizen of the United States, residing at Fremont, in the county of Sandusky and State of Ohio, have invented certain new and useful Improvements in Thill-Couplings; and I do hereby declare that the following is a full, clear, and exact description of the same, reference being had to the annexed drawings, making a part of this specification, and to the letters and figures of reference marked thereon.

Figure 1:
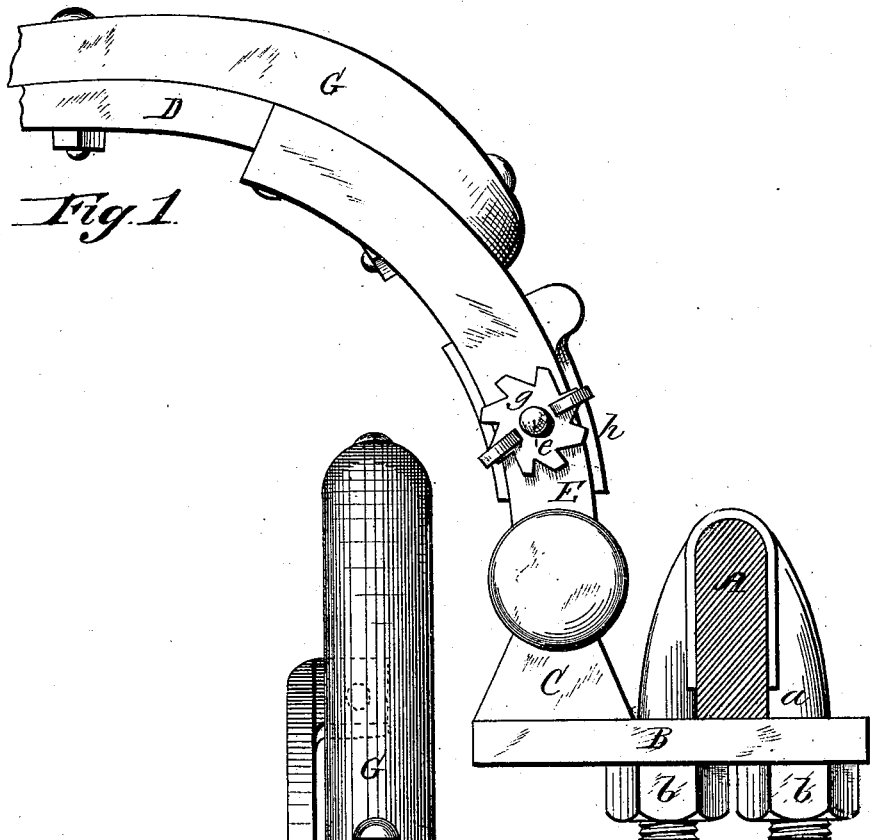
Figure 2:
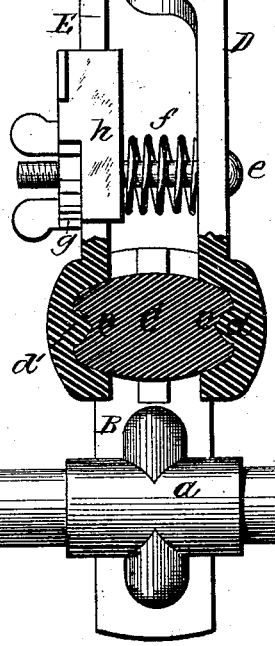

Figure 1 of the drawings is a side elevation of my invention; and Fig. 2, a top-plan view of the same, partly in section.

The present invention has relation to certain new and useful improvements in thill-couplings, whereby a more secure and perfect connection is made between the thill and axle of the vehicle, and whereby the joint may be tightened as wear takes place, or the thill may be removed altogether, as circumstances may require.

The invention consists in the construction illustrated in the drawings and hereinafter described.

In the accompanying drawings, A represents the axle, and $a$ the clip which holds the plate B thereon, the screw-threaded ends of the clip passing through the plate and engaging with screw-nuts $b$. The plate B projects beyond the front of the axle A, and has upright C, the same having upon its sides conical sockets or seats $c$, to receive conical journals or projections $d$ upon the inner sides of the arm D of the thill-iron, and the arm E, which is pivoted to the under side of said thill-iron, the latter being connected to the thill G in the usual manner. Passing loosely through the arms D E is a screw-bolt, $e$, having around it and between the arms a coiled spring, $f$. Upon the screw-threaded end of the bolt $e$, which projects beyond the outer face of the arm E, is a thumb ratchet-nut, $g$, the bolt $e$ passing through a pawl, $h$, which is kept engaged with the ratchet-teeth upon the nut $g$ by the spring $f$. By this construction the conical journals or projections $d$ may be tightened up against the conical depressions, sockets, or seats $c$, as the wear takes place, by turning the ratchet-nut $g$, the pawl $h$ holding the nut in position or against being unscrewed.

I do not desire to be understood as confining myself to the conical bearing upon that portion of the coupling connected to the axle, as, instead, it may be upon the arms D E and the journals formed on the upright C, or that portion connected to the axle; and I would further desire it understood that other forms of journals and bearings may be substituted without departing from my invention.

The arms D E may be in any suitable manner connected to the axle in place of being connected to the thill, in which case the thill-iron would have the bearings or journals, as the case may be.

These various modifications I reserve the right to make without going beyond the scope of my invention.

Having now fully described my invention, what I claim as new, and desire to secure by Letters Patent, is—

1. The means, substantially as described, for coupling a thill to the axle, consisting of two arms, one or both of which is yielding, and provided with means for holding them against their bearing, consisting of a spring, bolt, pawl, and ratchet, arranged to operate substantially as and for the purpose set forth.

2. The arms D E, bolt $e$, and spring $f$, in combination with the pawl $h$ and ratchet-nut $g$, substantially as and for the purpose set forth.

In testimony that I claim the above I have hereunto subscribed my name in the presence of two witnesses.

DENNIS S. BLUE.

Witnesses:
 H. R. FINEFROCK,
 C. H. BLUE.